United States Patent [19]

Wurfel

[11] 4,123,348
[45] Oct. 31, 1978

[54] PROCESS FOR CATALYTIC HYDROGENATION OF COAL

[75] Inventor: Helmut Wurfel, Niederwurzbach, Fed. Rep. of Germany

[73] Assignee: Saarbergwerke Aktiengesellschaft, Saarbrucken, Fed. Rep. of Germany

[21] Appl. No.: 742,605

[22] Filed: Nov. 17, 1976

[30] Foreign Application Priority Data

Nov. 18, 1975 [DE] Fed. Rep. of Germany ....... 2551641

[51] Int. Cl.$^2$ .............................................. C10G 1/08
[52] U.S. Cl. ..................................................... 208/10
[58] Field of Search ............................ 208/10, 158, 8; 23/288 E, 267 C; 134/1; 165/104 R, 104 F; 159/DIG. 3; 210/20

[56] References Cited

U.S. PATENT DOCUMENTS

| Re. 25,770 | 4/1965 | Johanson | 208/10 |
| 2,307,434 | 1/1943 | Veltman | 208/46 |
| 2,578,377 | 12/1951 | Smith | 208/158 |
| 2,742,381 | 4/1956 | Weiss et al. | 23/267 C |
| 2,750,681 | 6/1956 | Berry | 23/267 C |
| 2,987,465 | 6/1961 | Johanson | 208/10 |
| 3,019,079 | 1/1962 | Donohue | 210/20 |
| 3,092,515 | 6/1963 | Pike et al. | 23/267 C |
| 3,122,594 | 2/1964 | Kielback | 23/270 R |
| 3,226,092 | 12/1965 | Graham et al. | 23/267 C |
| 3,867,114 | 2/1975 | Doig | 55/77 |

FOREIGN PATENT DOCUMENTS 722,302  7/1942  Fed. Rep. of Germany ........... 208/158

OTHER PUBLICATIONS

Botterill, Fluid Bed Heat Transfer, Academic Press, 1975, p. 167.
McCabe et al., Unit Operations of Chemical Engineering, McGraw-Hill Book Co., 1967, pp. 171-172.
Buckham et al., ed. Fluidized-Bed Technology, Chem. Eng. Prog. Sym. Series, 1966, vol. 62, #67, pp. 51-56.

Primary Examiner—Delbert E. Gantz
Assistant Examiner—Joan Thierstein
Attorney, Agent, or Firm—M. Ted Raptes

[57] ABSTRACT

A process for performing reactions in a reaction vessel containing a catalyst bed of solid particles wherein the reaction between reactants is enhanced by imparting pulsating motion to the solid particles. The pulsating motion can be produced by pulsating introduction of at least one of the reactants, pulsating the introduction of recycled reaction products, etc.

5 Claims, No Drawings

PROCESS FOR CATALYTIC HYDROGENATION OF COAL

BACKGROUND OF THE INVENTION

This invention relates to an improved process of performing reactions between at least two reactants in the presence of solid particles, i.e. catalysts present in a reaction zone, which promote the reaction.

There are many known processes of performing chemical or physical reactions between a liquid and a gas in the presence of a catalytic material. In U.S. Pat. No. 2,987,469, a process is described wherein a liquid and gas are reacted in the presence of a mass of solid catalytic particles. The catalytic particles are maintained in random motion (ebullated) within a reaction zone of a vessel by the concurrent upward flowing streams of the liquid and the gas. The ebullated mass of solid particles has a gross volume larger than that of the same mass when it is stationary. Thus, the entire reaction zone is available as a movement area throughout which each of the catalytic particles may move.

The above described process has been used, inter alia, for performing exothermic chemical reactions, such as the hydrogenation of coal or heavy hydrocarbon oils, etc., however, the process possesses certain disadvantages. Because the individual catalytic particles are in a state of random motion, the particle density of the catalytic bed in the reaction zone is relatively very low, and therefore, the charge or throughput of reactant materials through the given volume of the reaction zone must be kept relatively very low. Furthermore, because of the relatively low density of the randomly moving catalytic particles within the reaction zone, the gaseous reactant as it passes through the zone, tends to form large bubbles. These gaseous bubbles pass through the zone relatively unhindered and enter into the intended reaction to a reduced degree.

A further disadvantage of the above described process is noted when the temperature of the exothermic hydrogenation reaction is adjusted by the introduction of cold hydrogen. The introduction disturbs the flow behavior of the reactants through the catalytic bed and there is a resultant formation of a turbulent layer in the catalytic bed, which boils strongly and foams. Catalytic particles are undesirably carried out of this layer together with the reaction products.

BRIEF SUMMARY OF THE INVENTION

An object of this invention is to provide a process for performing physical or chemical reactions between at least two reactants in a simplified and economical manner.

Another object of this invention is to provide a process for reacting liquid and gaseous reactants in the presence of solid catalytic particles maintained in pulsating or oscillating motion, whereby a significant increase in the particle density of the catalytic reaction zone is readily achieved in a given volume of the reaction zone.

The pulsating motion is achieved by the addition of at least one of the reactants into the reaction zone in a pulsating manner. In so doing, an unexpected increase in catalytic particle density per unit volume of the reaction zone is achieved, without the formation of undesirable agglomerates of particles and also without the formation of large bubble formation.

DETAILED DESCRIPTION OF THE INVENTION

In accordance with this invention, it was unexpectedly found that if a pulsating motion was imparted to the catalytic particles within the reaction zone, a significant increase in catalytic particle density per unit volume of the reaction zone is achieved as compared with the above described process. In addition, it was found that as a result of the pulsating motion, undesirable agglomerates of particles were not formed, nor undesirable deposits located between the particles. Thus, as a result of the pulsating motion of the particles, the entire surface of the particles is preserved and, therefore, the reaction product obtained in the reaction zone can be significantly increased as compared with the conventional process described above.

The process of this invention results in a further decided advantage whenever a gaseous reactant is involved in the reaction. It was noted that there was an absence of large bubble formation in the reaction zone. It was found that those bubbles formed had a maximum size which was about the same as the size of the soild catalytic particles.

The pulsating motion to the catalytic particles can be imparted in any suitable manner. In a particular embodiment of the invention, it was found that the pulsating motion could be achieved by the pulsating addition of at least one of the reactants into the reaction zone. In the case where a liquid reactant is involved in the reaction, it is recommended that a portion of the liquid reactant be added in a pulsating manner to the reaction zone. Thus, a portion of the liquid reactant can be added to the reaction zone as a constant, non-pulsating flow, whereas, the remaining portion can be superimposed as a pulsating flow on the constant original flow. By this type of introduction of the liquid reactant, the original constant flow provides for a loosening of the solid catalytic particles and the pulsating flow provides for the pulsating motion or movement of the particles.

The process of this invention is particularly useful for conducting highly exothermic chemical reactions such as the hydrogenation of coal or heavy hydrocarbon oils. In these reactions, wherein a carbon-containing liquid, e.g. a slurry of coal powder suspended is oil as is conventional where coal is hydrogenated, and hydrogen are reacted in a reaction zone, it is usually the procedure to recycle a portion of the liquid reaction products leaving the reaction zone back into the reaction zone. In accordance with this invention, the recycled liquid reaction products can be introduced in a pulsating manner to impart a pulsating motion to the catalytic particles in the reaction zone. Pulsation of the recycled liquid can be accomplished by circulating pump means in the recycle line. In this case, it is advantageous to first effect a loosening of the catalytic particles by means of the original flow of liquid reactant to the reaction zone, and then to impart the pulsating motion to the particles by superimposing the recycled liquid on the original flow.

The process of this invention also has another very essential advantage with respect to the required periodic replenishing of the particles in the reaction zone, i.e. removal of spent catalyst and the addition of new or regenerated catalyst. In the conventional process described above, where all the catalytic particles are in random motion throughout the reaction zone, unspent catalyst particles can be unavoidably carried out with spent catalyst particles, thus reducing the efficiency of the process. Contrary thereto, in accordance with the process of the invention, wherein the particles are in a particular type of motion, due to the character of the pulsating motion, each particle is moving only within a relatively restricted portion of the reaction zone. Because of this restricted movement, a systematic exchange of catalyst particles can be accomplished by adding fresh catalyst particles into the top of the reaction zone and removing spent catalyst from the bottom, preferably during the time when the reactor is in operation. It was found that fresh catalyst systematically moves slowly downwardly through the reaction zone in accordance with the amount of spent catalyst which is removed from the bottom. By this procedure, very little fresh or unspent catalyst particles are removed, and thus the efficiency and economics of the reaction are favorably improved.

As stated previously, the process of the invention is especially advantageous with highly exothermic types of reaction processes, but is not restricted thereto. The process of the invention is easily adaptable for use with physical processes, such as heat exchange, adsorption, and absorption processes. Similarly, in chemical reaction processes, if desired, a filling of inert solids, such as aluminum oxide, may be provided in the reaction zone, and the catalyst can be added to the reactants in a finely divided dust or powder state.

The invention will now be exemplified by the following example which involves a process for hydrogenating coal.

EXAMPLE

Coal dust, which is to be hydrogenated, is conventionally mixed with a heavy hydrocarbon oil to form a slurry. The slurry and hydrogen are introduced by means of a pump into the bottom of a vertical hydrogenating reactor passing first through a spiral preheating tube. A horizontal sieve plate or screen is arranged directly above the introduction level of the reactor and catalyst particles are placed thereon to form a catalyst bed. Above the catalyst bed, a liquid reaction mixture with the coal suspended therein, is withdrawn from the reactor by means of a conventional circulating pump, and is recycled into the bottom of the reactor. The recycling produces a thorough mixing with the fresh mixture of coal, oil, and hydrogen. The circulating pump is designed to operate in such a manner that a pulsating flow of the recycled liquid can be superimposed on the original flow of fresh mixture, the original flow already providing a loosening of the catalyst bed without causing the individual particles to move in the pulsating state. With the superimposed pulsating flow, the individual particles are set into a pulsating or oscillating motion, whereby the entire catalyst bed performs a kind of breathing movement and the surface of the catalyst bed moves up and down periodically.

From the foregoing, one skilled in the art can easily ascertain the essential characteristics of the invention, and without departing from the spirit and scope thereof, can make various changes and modifications of the invention to adapt it to various usages and conditions.

What is claimed is:

1. In a process for the hydrogenation of coal wherein an original slurry flow of coal and oil reactants is introduced into and hydrogenated in a reaction zone in the presence of hydrogen and a bed of solid particles comprising a catalyst, to produce a reaction product which is withdrawn from the upper portion of said reaction zone, the improvement comprising imparting pulsating motion to said bed in said reaction zone by intermittantly introducing and superimposing onto said original slurry flow one of the following:
   a. recycled reaction product
   b. slurry of coal and oil whereby a pulsating motion is imparted to said solid particles in said bed.

2. The process of claim 1 wherein said original slurry is introduced as a constant flow to loosen said particles in said bed and a portion of said slurry is introduced as a pulsating flow superimposed on said original flow to impart said pulsating motion to said particles in said catalyst bed.

3. The process of claim 1 wherein a catalyst is added to the reactants in dust form and said solid particles comprise an inert material.

4. The process of claim 1 wherein said solid particles comprise an inert material.

5. The process of claim 1 wherein a portion of said reaction product is recycled to the lower portion of said reaction zone and intermittently introduced and superimposed onto said original slurry flow.